(12) United States Patent
Park et al.

(10) Patent No.: US 8,285,347 B2
(45) Date of Patent: Oct. 9, 2012

(54) S.O.S COVER OPENING AND SHUTTING APPARATUS FOR PORTABLE TERMINAL

(75) Inventors: Jae-Hong Park, Gyeongsangbuk-do (KR); Jung-Hee Go, Gyeongsangbuk-do (KR); Kyu-Hwan Lim, Gyeongsangbuk-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 373 days.

(21) Appl. No.: 12/618,826

(22) Filed: Nov. 16, 2009

(65) Prior Publication Data
US 2010/0130269 A1    May 27, 2010

(30) Foreign Application Priority Data
Nov. 27, 2008    (KR) .................. 10-2008-0118613

(51) Int. Cl.
*H04B 1/38*    (2006.01)
*H04B 1/08*    (2006.01)
*H04M 1/00*    (2006.01)

(52) U.S. Cl. ................... 455/575.1; 455/90.3; 455/347; 455/575.4; 455/575.8

(58) Field of Classification Search ........ 455/90.1–90.3, 455/347–349, 575.1–575.4, 575.8
See application file for complete search history.

(56) References Cited

U.S. PATENT DOCUMENTS

| | | | |
|---|---|---|---|
| 8,036,725 B2 * | 10/2011 | Araki et al. ................ | 455/575.3 |
| 2003/0137422 A1 | 7/2003 | Nishibori | |
| 2006/0019729 A1 | 1/2006 | Harris | |
| 2007/0008127 A1 | 1/2007 | Jakobsen | |
| 2007/0008165 A1 | 1/2007 | Jeon | |
| 2008/0220817 A1 * | 9/2008 | Nagamine et al. ......... | 455/556.1 |
| 2009/0111514 A1 * | 4/2009 | Matsuda et al. .......... | 455/556.1 |

FOREIGN PATENT DOCUMENTS

| GB | 2360904 | 10/2001 |
|---|---|---|
| WO | WO2008/120917 | 10/2008 |

* cited by examiner

*Primary Examiner* — Simon Nguyen
(74) *Attorney, Agent, or Firm* — Cha & Reiter, LLC

(57) ABSTRACT

An S.O.S. cover opening and shutting apparatus for a portable terminal allows a user to activate an S.O.S. service by slidingly moving an S.O.S. cover of the portable terminal. The S.O.S. cover opening and shutting apparatus includes an S.O.S. cover for opening and shutting a part of the portable terminal by sliding movement, a rear case in which the S.O.S. cover is arranged against/in, and a bracket fixedly coupled to the S.O.S. cover to permit movement of the S.O.S. cover only in a predetermined section.

11 Claims, 10 Drawing Sheets

S.O.S COVER OPENING AND SHUTTING APPARATUS FOR PORTABLE TERMINAL

CLAIM OF PRIORITY

This application claims the benefit under 35 U.S.C. §119 (a) of a Korean Patent Application filed in the Korean Intellectual Property Office on Nov. 27, 2008 and assigned Serial No. 10-2008-0118613, the entire disclosure of which is hereby incorporated by reference in its entirety.

BACKGROUND OF THE INVENTION

1. Field of the Invention

The present invention relates to an S.O.S. ("Save Our Ship", e.g. emergency) cover opening and shutting apparatus for a portable terminal, capable of allowing a user to access an emergency call service, or an S.O.S. service.

2. Description of the Related Art

Recently, a variety of functions have been added to portable terminals to meet various demands of users. In particular, the multimedia functions for delivering image data as well are currently the most popular—and include such functions as e-mail, Internet, games and the like based on portable terminals—which are also added/updated on a regular basis.

Such portable terminals periodically communicate with a base station in the area where they are presently located, to inform/update the base station of their current locations, thereby enabling calls to be seamlessly received. When the portable terminals are relocated by vehicles or walking, the portable terminals often switch communication from the current base station to a new base station in the area to which they are going to move, if the relocation crosses into an area better handled by a new/different base station.

In our very complex and free society, users of portable terminals can be exposed to many dangers. For example, many emergency situations may happen, in which users are threatened, injured, kidnapped by suspicious fellows, meet with a disaster by a fire or lost in the mountains, or are locked in airtight spaces, just to name a few of the potential dangers that are the subject of media reporting. Conventionally, when these emergency situations occur, the users of portable terminals generally make a call directly using the portable terminals to inform an acquaintance, police, a relief squad or the like of the emergency situations. In most cases, however, the users may have difficulty in making a call in the emergency situations to inform the emergency situations. For example, in the United States, dialing 911 from a wireless telephone will generally forward your call to an emergency center closest to a particular base station. However, the system is not perfect and sometimes the closest emergency responders are not the ones notified via the 911 system.

Many portable terminals now enable users to notify responders of their emergency situation/status to a previously registered portable terminal(s) by manipulating an input means such as an emergency button provided on the portable terminals when crimes or emergency disasters happen. In this case, however, an unnecessary S.O.S. service may occasionally be activated by user's mismanipulation. Then, a user of the portable terminal receiving the unnecessary call or message may be placed into a difficult situation, which may give an unpleasant feeling to the user of the receiving portable terminal. In addition, one might say they accidentally pushed the button because an assailant is threatening them with immediate bodily harm unless they lie to the responder and say that the activation of the button was an accident.

Therefore, the conventional portable terminal has limitations on the environments in which the user can inform a responder of an emergency situation, and thus, the user may have difficulty in asking surrounding people for a help without mismanipulation.

SUMMARY OF THE INVENTION

An aspect of the present invention provides an S.O.S. cover opening and shutting apparatus for a portable terminal, capable of offering an efficient operation of an S.O.S. service informing user's emergency situations, by slidable activation. The act of slidingly moving an S.O.S. cover of the portable terminal activates the function of contacting the emergency services, and at the same time has a lower rate of accidental activations when compared to keypad button type emergency actuators.

Another exemplary aspect of the present invention provides an S.O.S. cover opening and shutting apparatus for a portable terminal, capable of providing a differentiated design by making an S.O.S. cover of the portable terminal such that it can be slidingly moved to activate an emergency notification.

Furthermore, another exemplary aspect of the present invention provides an S.O.S. cover opening and shutting apparatus for a portable terminal, which provides a stopper capable of stopping a sliding movement of an S.O.S. cover, and has a separate protrusion to offer a "click" sensation so that a user can feel the sliding movement.

Yet another exemplary aspect of the present invention provides an S.O.S. cover opening and shutting apparatus for a portable terminal, capable of preventing misuse of an S.O.S. service due to user's mismanipulation by enabling the user to simply manipulate or implement the S.O.S. service of the portable terminal.

According to still another exemplary aspect of the present invention, there is provided an S.O.S. cover opening and shutting apparatus for a portable terminal. The apparatus includes an S.O.S. cover for opening and closing a part of the portable terminal by a sliding movement; a rear case in which the S.O.S. cover is settled; and a bracket fixedly coupled to the S.O.S. cover to approve movement of the S.O.S. cover only in a predetermined section.

Preferably, the S.O.S. cover may include an S.O.S. contact contacting a sensor contact provided on a sensor in a body to implement an S.O.S. service when the S.O.S. cover slidingly moves.

Other exemplary aspects, advantages, and salient features of the present invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary and provided for illustrative purposes the claimed invention is not limited to the examples shown and described. Accordingly, those of ordinary skill in the art will recognize that various changes and modifications of the exemplary embodiments described herein can be made without departing from spirit of the invention and the scope of the appended claims. In addition, descriptions of well-known functions and constructions may be omitted for clarity and conciseness when their inclusion could obscure appreciation of the subject matter of the present invention by a person of ordinary skill in the art.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
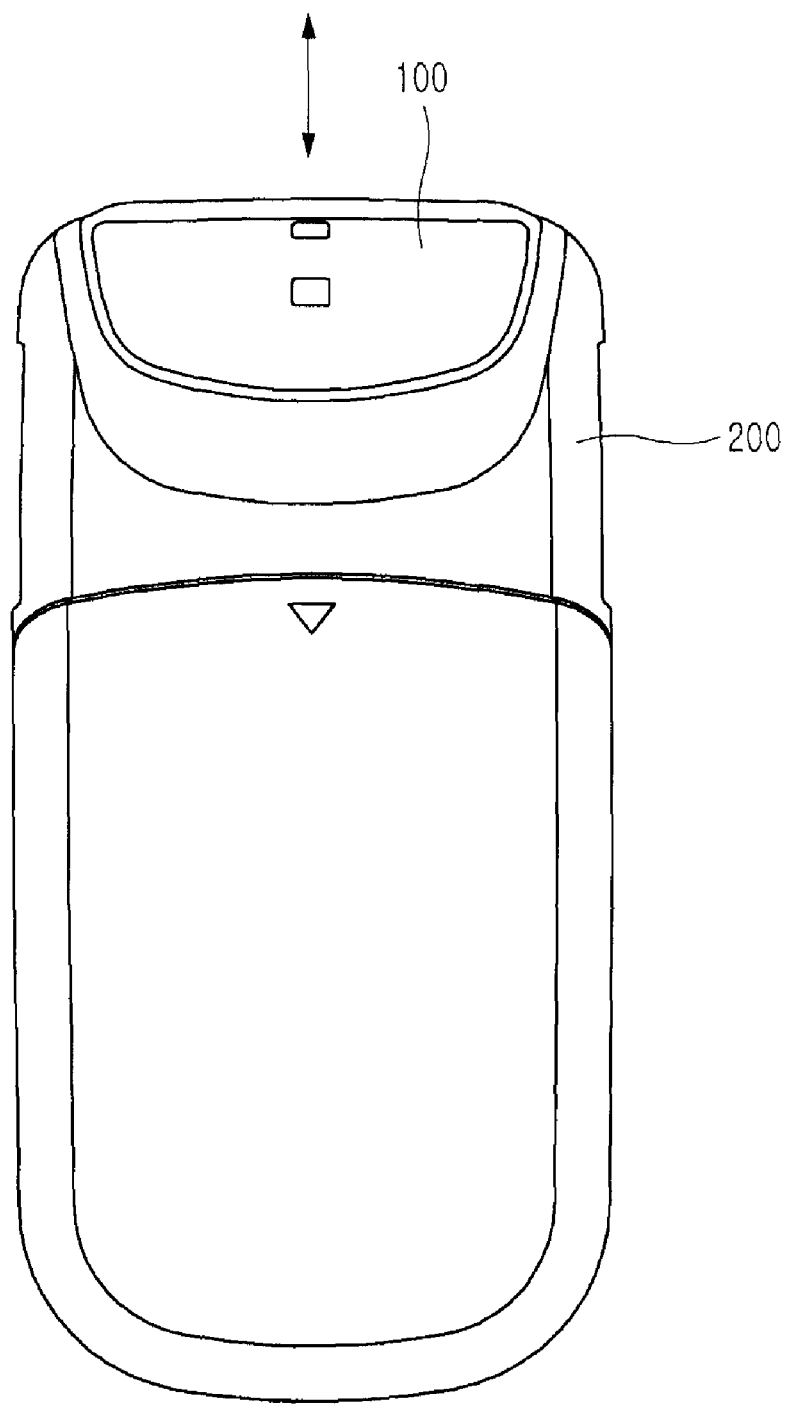
FIG. 1 illustrates a rear side of a portable terminal, with an S.O.S. cover being closed, according to an exemplary embodiment of the present invention.
Figure 2:
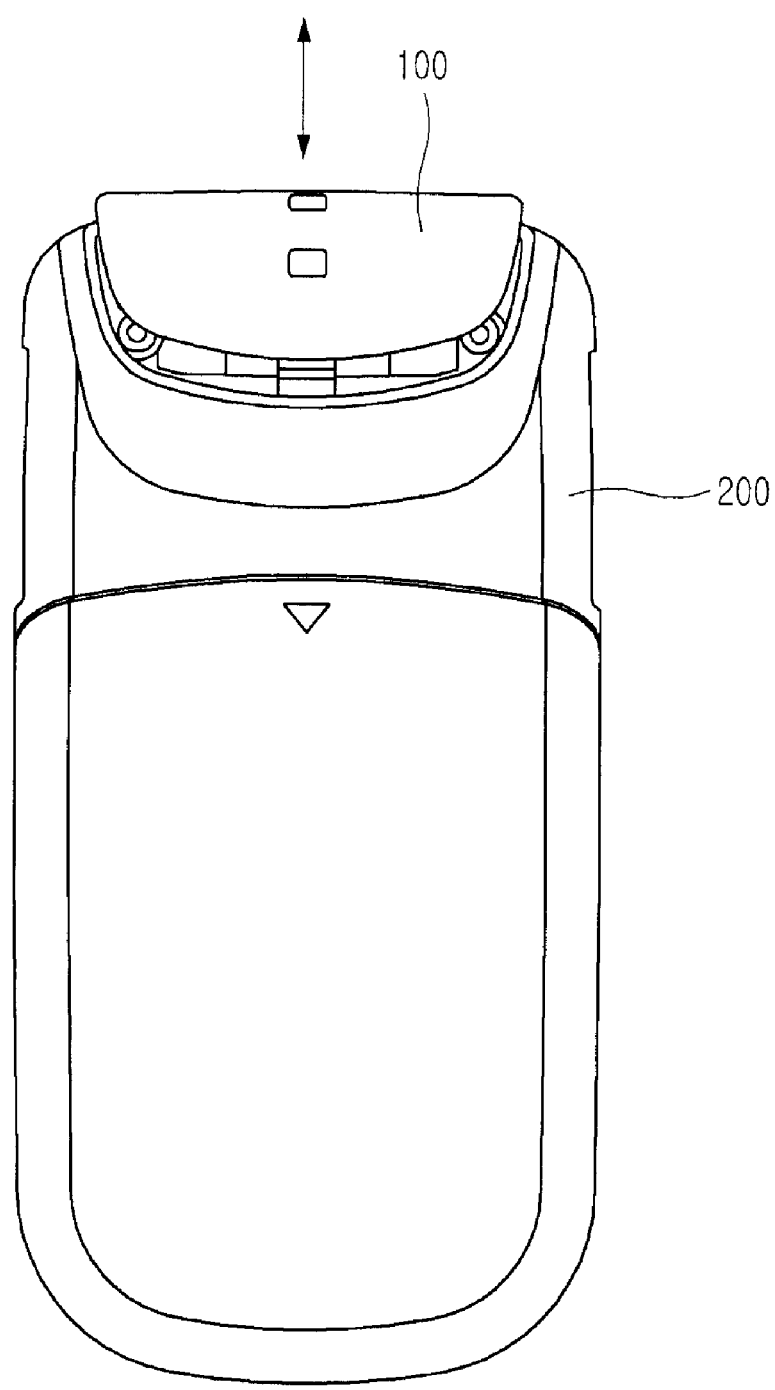
FIG. 2 illustrates a rear side of a portable terminal, with an S.O.S. cover being open, according to an exemplary embodiment of the present invention.

FIGS. 1 and 2 illustrate a rear side of a portable terminal. More specifically, FIG. 1 illustrates a state in which an S.O.S. cover 100 is shut as it is fixed to a rear case 200, which is a rear side of a body of a portable terminal, and FIG. 2 illustrates the state in which the S.O.S. cover 100 is open as it is slidingly moved in the state where the S.O.S. cover 100 is fixed to the rear case 200. The S.O.S. cover 100 should not necessarily be formed on the rear side of the body of the portable terminal as illustrated in FIGS. 1 and 2. Instead of being arranged as shown, the S.O.S. cover 100 may be formed on a front side or a flank side, etc. of the portable terminal.

Portable terminals can be generally classified into flip-type terminals, folder-type terminals, bar-type terminals, sliding-type terminals and so forth according to their appearance and/or operational manner. The present invention can be applied to at least all of the above types of the portable terminals.

Although a mobile communication terminal is given herein as a typical example of a portable terminal according to an exemplary embodiment of the present invention, it is not intended to limit the scope of the present invention to the mobile communication terminal, and the present invention can be applied to various other types of portable terminals.

For example, portable terminals according to an exemplary embodiment of the present invention may include all information technology devices, multimedia devices and their associated application devices, such as a Portable Multimedia Player (PMP), an MP3 player, a digital broadcasting player, Personal Digital Assistant (PDA) and smart phone, including all mobile communication terminals operating based on communication protocols corresponding to various communication systems, just to name a few possibilities.

Figure 3:
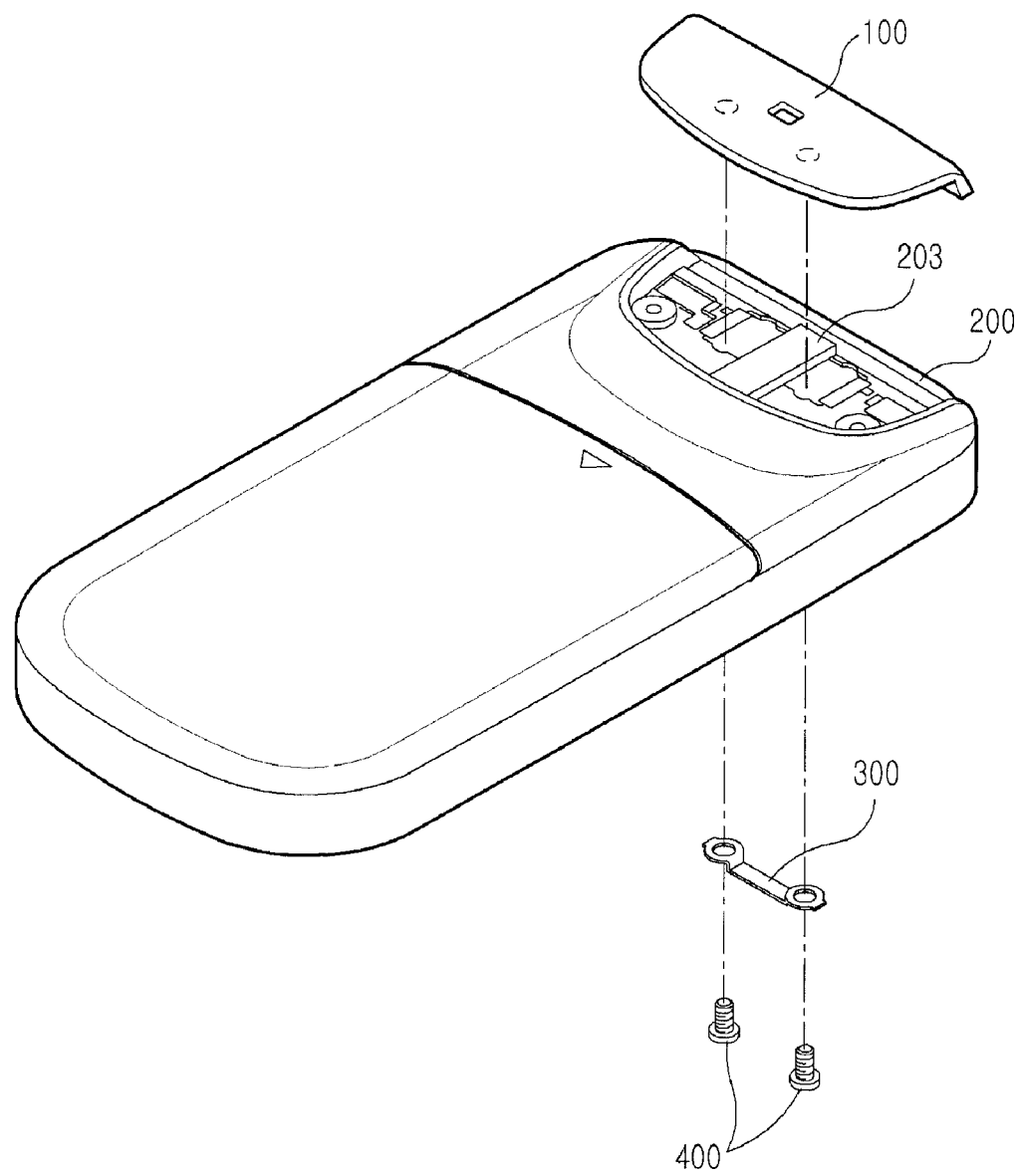
FIG. 3 illustrates how to assemble an S.O.S. cover in a portable terminal according to an exemplary embodiment of the present invention.

FIG. 3 schematically illustrates how to assemble an S.O.S. cover 100 in a portable terminal according to an exemplary embodiment of the present invention. Referring now to FIG. 3, the portable terminal includes an S.O.S. cover 100 that a user may slidingly move via a manual operation, a rear case 200 in which the S.O.S. cover 100 is to be arranged, and a bracket 300 serving as a stopper, fixed to the S.O.S. cover 100 by screws 400 so that the S.O.S. cover 100 may not be detached from the portable terminal when the S.O.S. cover 100 is slidingly moved.

Thus, when the user slidingly moves the S.O.S. cover 100, the S.O.S. cover 100 will slidingly move together with the bracket 300 and stay attached to the portable terminal.

Figure 4A:
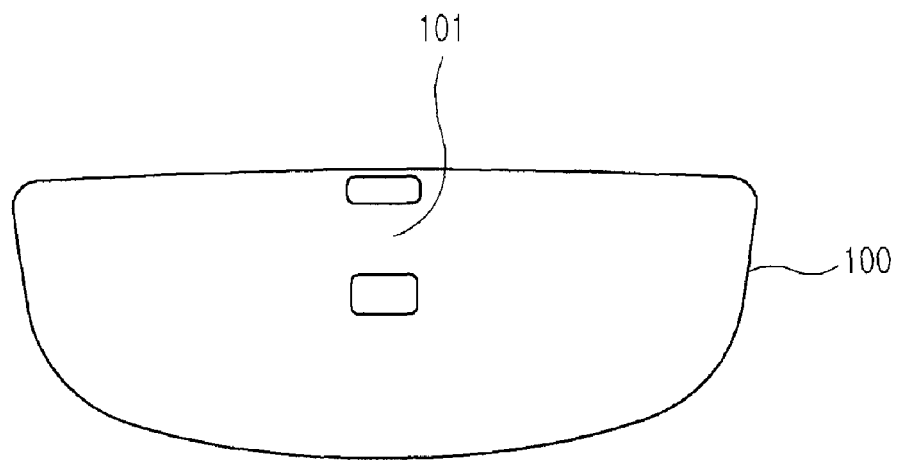
FIGS. 4A and 4B illustrate a front side and an inside of an S.O.S. cover, respectively.

FIG. 4A illustrates a front side of the S.O.S. cover 100 having a lock 101 for allowing the user to readily attach and detach the S.O.S. cover 100 to/from the portable terminal.

Figure 4B:
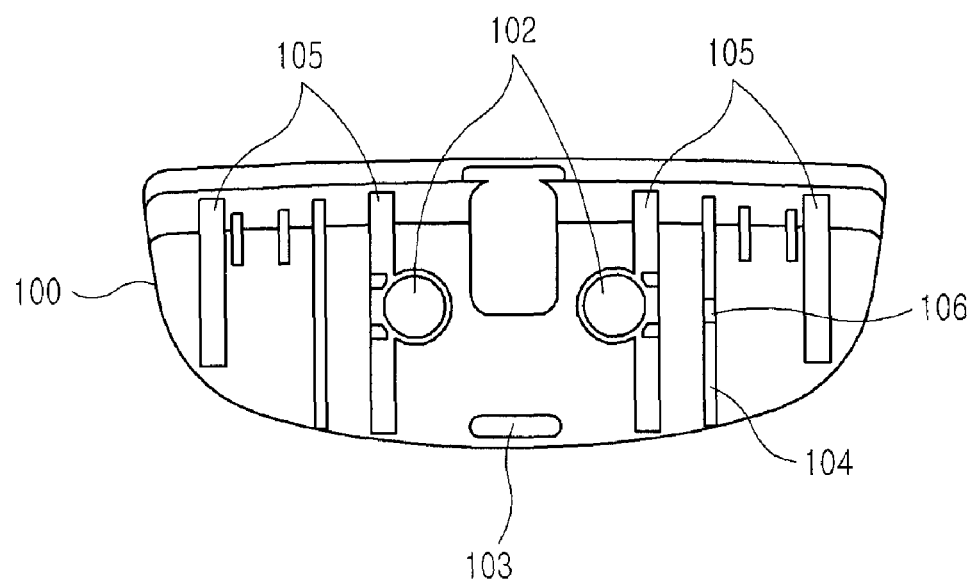

FIG. 4B illustrates an inside of the S.O.S. cover 100 that has screw fixing holes 102 for fixing the bracket 300, and a protrusion 103, formed on a lower portion of the S.O.S. cover 100, which serves to give a click feeling to the user when the S.O.S. cover 100 slidingly moves, to prevent the S.O.S. cover 100 from freely moving, and to fix the S.O.S. cover 100 to the rear case 200 in a safe state. The protrusion 103 will be described below in more detail. For example, the protrusion 103 may be formed by making a projection on an injection-molded product, or by putting a separate metal plate on the injection-molded product.

In addition, the S.O.S. cover 100 in FIG. 4B has separate S.O.S. contacts 106 that is linked to a circuit part to inform the user's emergency situations by slidingly moving the S.O.S. cover 100, or to output a separate emergency alarm sound by the portable terminal. The S.O.S. contacts 106 will be described in connection with other drawings.

Figure 4C:
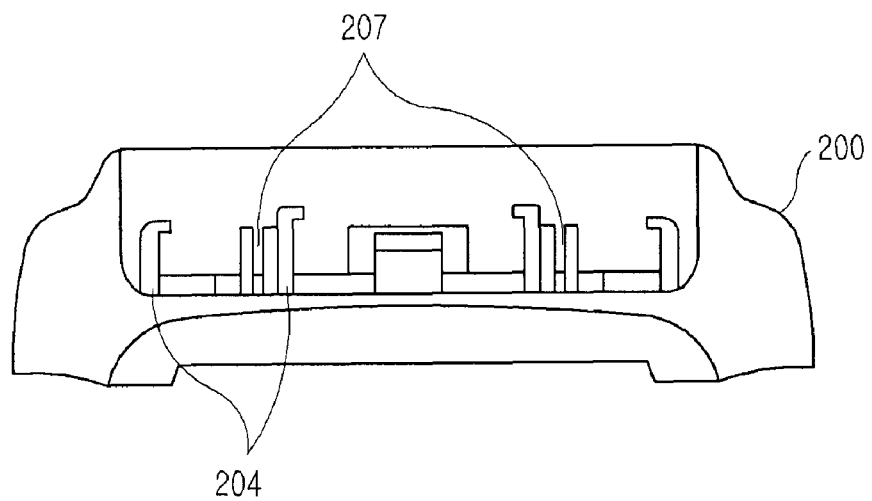
FIG. 4C illustrates a flank side of an S.O.S. cover.

FIG. 4C illustrates a side of the S.O.S. cover 100 having separate guides 204 that are coupled to the rear case 200 to prevent left/right swinging (free moving) against the rear case 200 during a sliding movement. The guides 204 are fit into sliding grooves 207 formed on the rear case 200, inducing the sliding movement. Further, the S.O.S. cover 100 (FIG. 4B) has ⌐-shaped (i.e. "L-shaped") hooks 105 coupled to the rear case 200 to prevent up/down swinging during a sliding movement.

Figure 5:
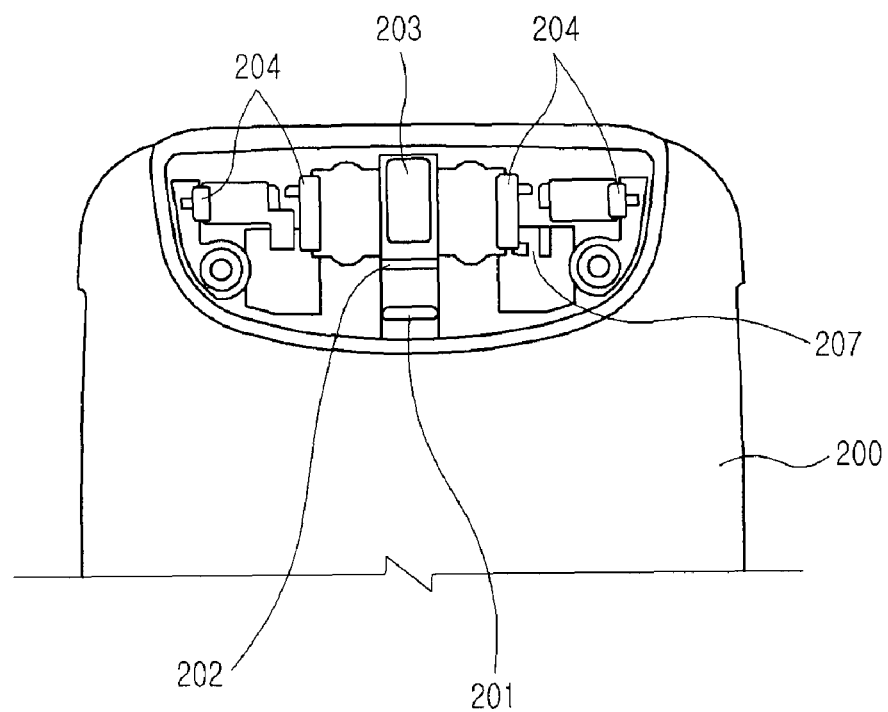
FIG. 5 illustrates an inside of a rear case of a portable terminal, in which an S.O.S. cover is settled, according to an exemplary embodiment of the present invention.

FIG. 5 illustrates an inside area of the rear case 200 of an exemplary portable terminal. The rear case 200 has first and second case protrusions 201 and 202 for providing a clicking sensation to the user when the S.O.S. cover 100 slidingly moves so that the protrusions 201, 202 contact the protrusion 103 on the S.O.S. cover 100, and also has a sliding support 203 along which the bracket 300 screwed to the S.O.S. cover 100 may be slidingly moved, in which bracket 300 and support 203 comprise a bracket assembly 300a (FIG. 7B). Further, the rear case 200 has ⌐-shaped guide protrusions 204 which are fit into the ⌐-shaped hooks 105 on the S.O.S. cover 100 in the opposite direction to prevent up/down swinging. The rear case 200 has sliding grooves 207 into which the guides 104 on the S.O.S. cover 100 are inserted, inducing the sliding movement.

Figure 6:
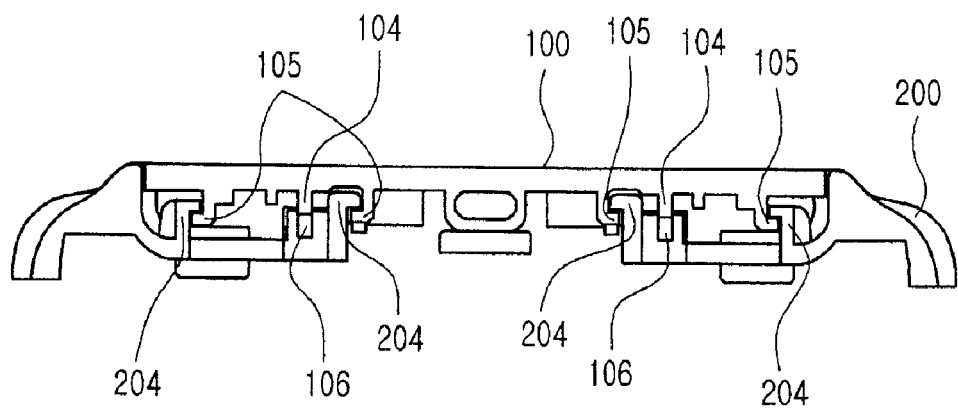
FIG. 6 illustrates a side elevation view in a state where an S.O.S. cover is coupled to a rear case.

FIG. 6 illustrates a side elevation view in a state where the S.O.S. cover 100 is coupled to the rear case 200. The S.O.S. cover 100 has the S.O.S. contacts 106 that generate electrical signals when the S.O.S. cover 100 slidingly moves. The ⌐-shaped guide protrusions 204 are formed even on the rear case 200 in association with the ⌐-shaped hooks 105 on the S.O.S. cover 100 in order to prevent up/down swinging generated when the S.O.S. cover 100 slidingly moves. The number of the hooks 105 and the guide protrusions 204 is subject to change according to a size of the portable terminal.

Figure 7A:
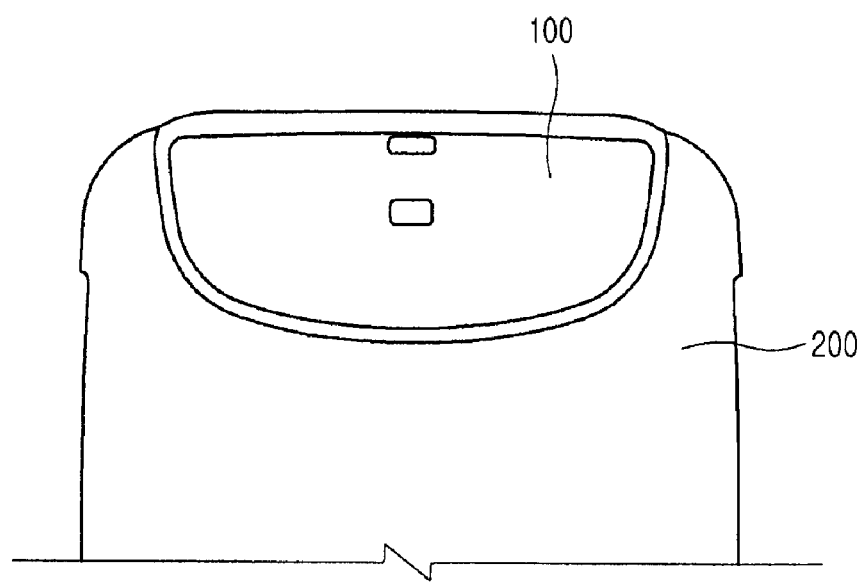
FIG. 7A illustrates a rear side of a portable terminal in a state where an S.O.S. cover coupled to a rear case has not slidingly moved.
Figure 7B:
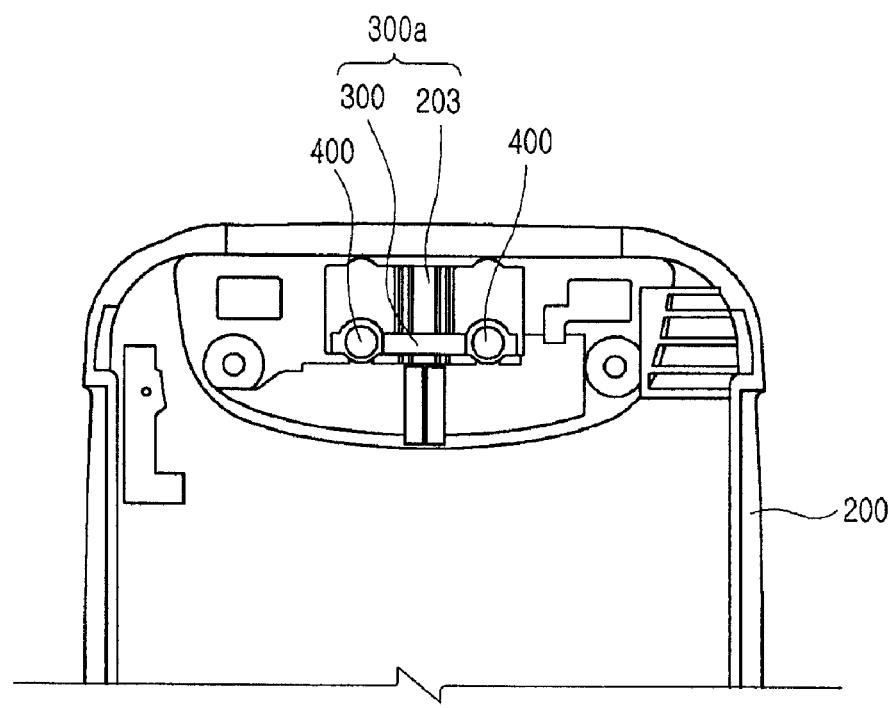
FIG. 7B illustrates an inside of the rear case of FIG. 7A.
Figure 7C:
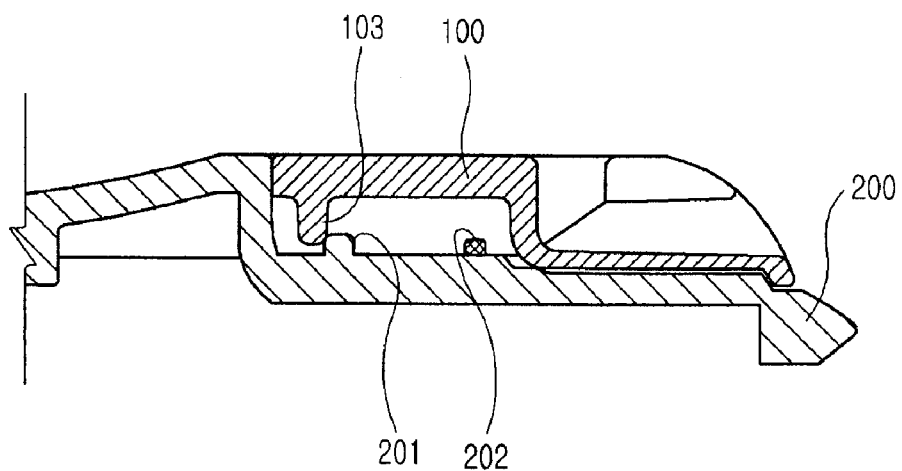
FIG. 7C is a cross sectional view of FIG. 7A.

FIG. 7A illustrates a rear side of a portable terminal in a state where the S.O.S. cover 100, which is coupled to the rear case 200, has not slidingly moved. FIG. 7B illustrates an inside of the rear case 200 in FIG. 7A. In FIG. 7B, the bracket 300 is fixed by screws 400. FIG. 7C is a cross sectional view of FIG. 7A, showing a safe state in which the S.O.S. cover 100 may not be easily slid since the protrusion 103 on the S.O.S. cover 100 is hooked by the first case protrusion 201 on the rear case 200.

Figure 8A:
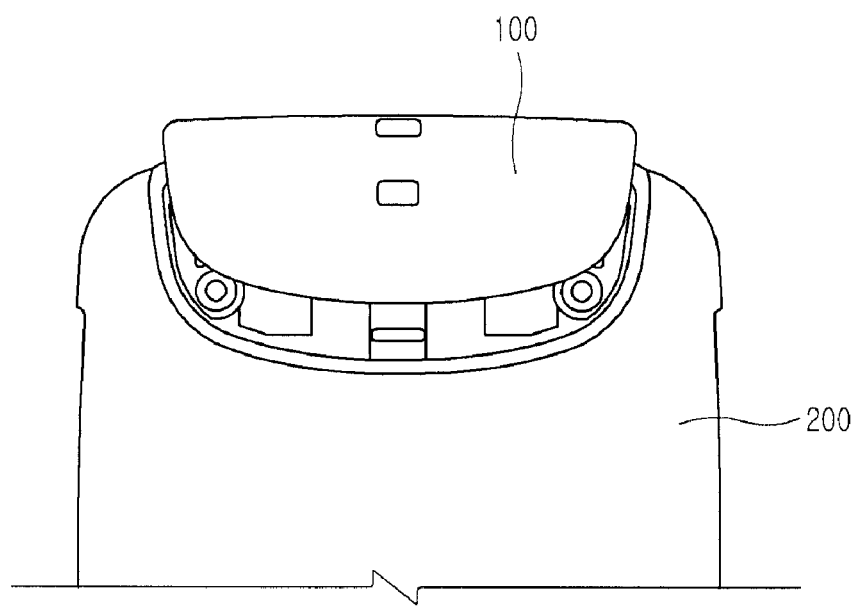
FIG. 8A illustrates an outward appearance of a rear side of a portable terminal in a state where an S.O.S. cover coupled to a rear case has slidingly moved.
Figure 8B:
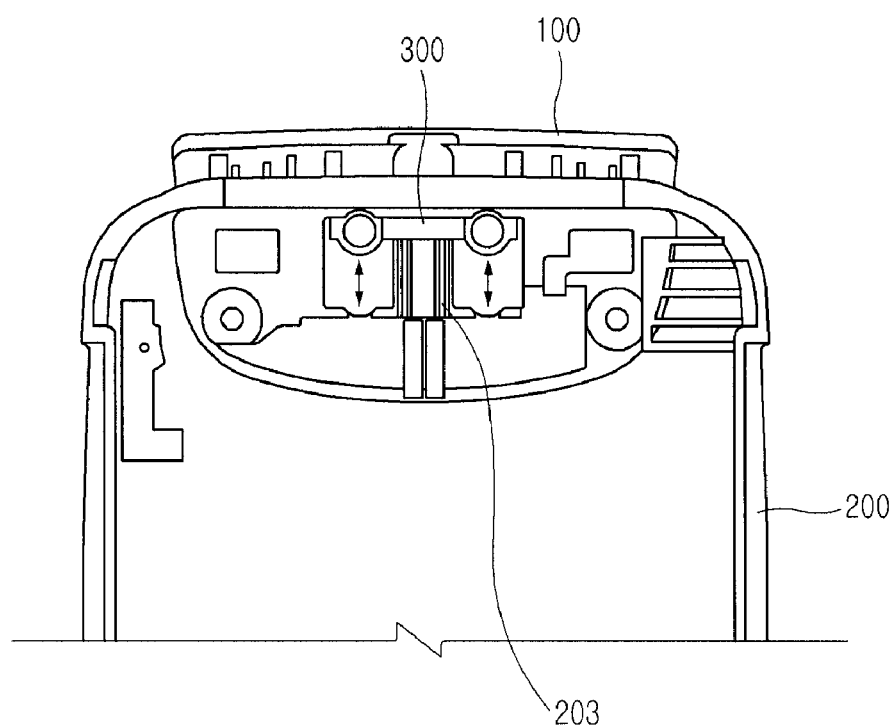
FIG. 8B illustrates an inside of the rear case of the portable terminal.

FIGS. 8A and 8B illustrate the outward appearance of the rear side and the rear case 200 of the portable terminal in a state where the S.O.S. cover 100, which is coupled to the rear case 200, has slidingly moved. When FIG. 8B is compared with FIG. 7B, it can be appreciated that a location of the bracket 300 has moved from the lower portion in the state of FIG. 7B to the upper portion in the state of FIG. 8B as the S.O.S. cover 100 has slidingly moved.

Figure 8C:
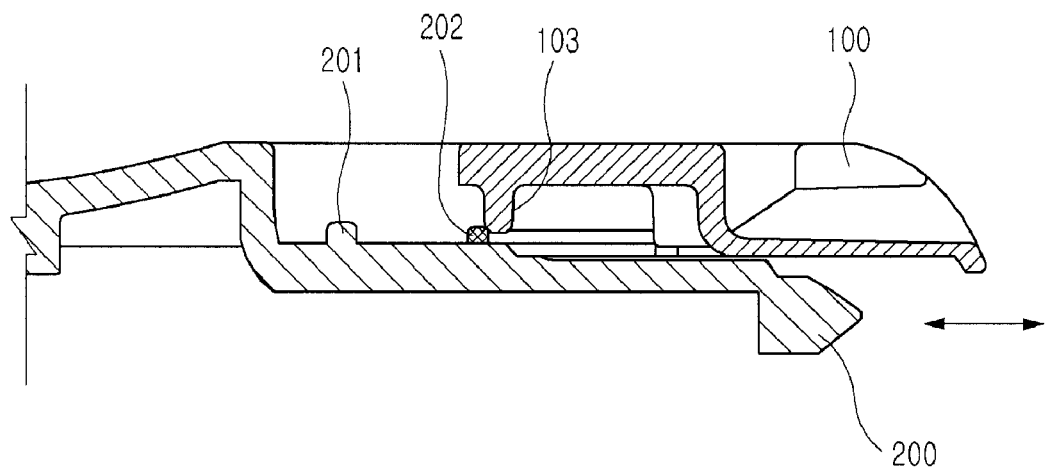
FIG. 8C is a cross sectional view of FIG. 8A.

Furthermore, in FIG. 8B, the bracket 300 may serve as a stopper that prevents the S.O.S. cover 100 from being detached from the portable terminal as it contacts an end of the sliding support 203 on the rear case 200. FIG. 8C is a cross sectional view of FIG. 8A, and when it is compared with FIG. 7C, the protrusion 103 on the S.O.S. cover 100 has moved from the location of the first case protrusion 201 on the rear case 200 to the second case protrusion 202 by the sliding movement. If the protrusion 103 on the S.O.S. cover 100 contacts the first and second case protrusions 201 and 202 on the rear case 200 by the sliding movement, a click feeling may be provided to the user and the S.O.S. cover 100 can be prevented from being easily slid, as a certain degree of force is necessary to cause the protrusion 103 to slide over the first protrusion 201.

Figure 9A:
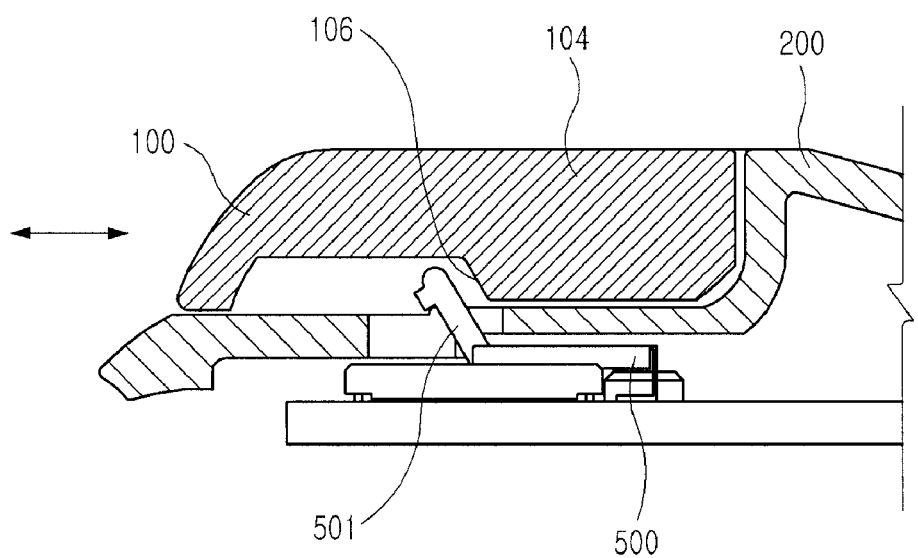
FIGS. 9A and 9B illustrate how an S.O.S. contact formed on an S.O.S. cover contacts a sensor contact provided on a sensor in a body of the portable terminal.
Figure 9B:
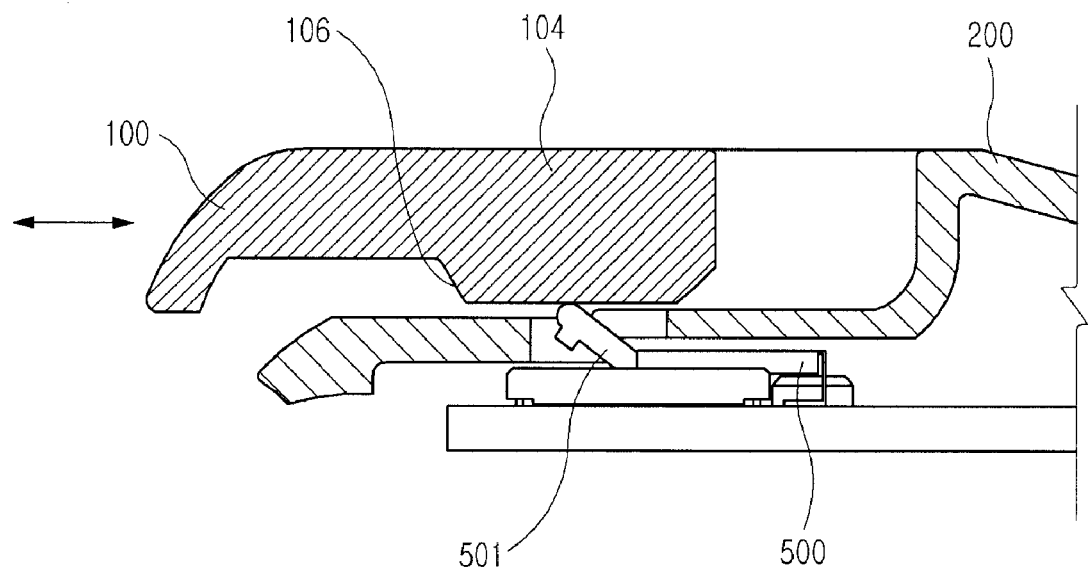

FIGS. 9A and 9B illustrate how the S.O.S. contact 106 formed on the guide 104 of the S.O.S. cover 100 contacts a sensor contact 501 provided on a sensor 500 in a body of the portable terminal. While the S.O.S. cover 100 slidingly moves from the state of FIG. 9A to the state of FIG. 9B, the S.O.S. contact 106 contacts the sensor contact 501, activating the S.O.S. service. That is, the S.O.S. service is a service that sends an emergency message to a previously registered phone number(s) and/or generates an emergency alarm sound by the user.

Figure 10:
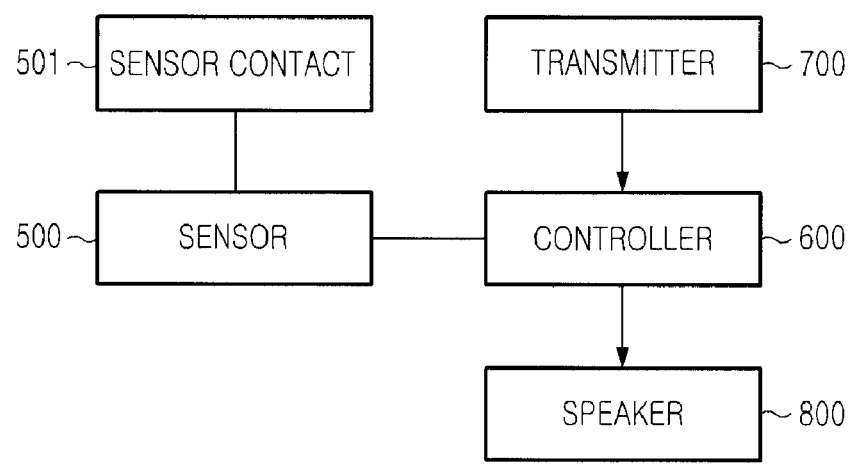
FIG. 10 illustrates a circuit diagram for implementing an S.O.S. service when an S.O.S. cover slidingly moves, according to an exemplary embodiment of the present invention.

FIG. 10 illustrates a circuit diagram for implementing an S.O.S. service when an S.O.S. cover slidingly moves, according to an embodiment of the present invention. The S.O.S. service is implemented or activated by the sliding movement of the S.O.S. cover 100. Referring now to FIGS. 9A, 9B and 10, in operation, as the S.O.S. cover 100 slidingly moves, the S.O.S. contact 106 touches the sensor contact 501 provided on the sensor 500 in the body of the portable terminal. When the S.O.S. contact 106 touches the sensor contact 501, the sensor 500 senses the touch of the sensor contact 501, generates an electrical signal and applies the electrical signal to a controller 600, which implements the S.O.S. service. The controller 600 controls a transmitter 700 to deliver the S.O.S. service to a phone number the user already registered, to which he/she intends to notify the emergency situations, and also controls a speaker 800 to generate an S.O.S. alarm sound.

While the invention has been shown and described with reference to a certain exemplary embodiments thereof, it will be understood by those skilled in the art that various changes in form and details may be made therein without departing from the spirit and scope of the invention as defined by the appended claims and their equivalents. For example, while in the exemplary embodiments disclose above the S.O.S. cover moves, it is within the spirit of the invention and the scope of the appended claims that the S.O.S. cover could clickably slides along an exterior of the S.O.S cover to, for example, activate a switch such as switch 501 shown in FIGS. 9A and 9B. Also, only a portion of S.O.S. cover might move. In addition, while one exemplary switch 501 associated with a predetermined emergency contact is shown, it is also within the spirit and scope of the invention to either provide a plurality of switches, or an optical sensor and a series of marks (or reflective material) and/or a magnetic means, so that a position of a lower portion of S.O.S. cover in the vicinity of contact 106 can be sensed to activate an emergency call. Also, a pressure switch could be used, whereby squeezing the S.O.S. cover activates an emergency call. In addition, for example, it is also within the spirit and scope of the invention that although the examples show one switch and one S.O.S. emergency contact, there could be more than one emergency contact based on the position the cover is clickably slid to in the event of an emergency.

In addition, while the exemplary bracket shows being affixed to the S.O.S. cover via screws, we note that a person of ordinary skill in the art understands and appreciate that the any type of coupling that permits the invention to operate as intended could be used. For example, instead of screws, nuts and bolts, clips, pins, welds, snap fit male-female interconnections and bonding are just a few possible examples of how the cover and bracket could be coupled.

What is claimed is:

1. An S.O.S. cover opening and shutting apparatus for a portable terminal, comprising:
   the S.O.S. cover for opening and shutting a part of the portable terminal by sliding movement;
   a rear case in which the S.O.S. cover is arranged against/in when the S.O.S. cover shuts the part of the portable terminal; and
   a bracket assembly for slidably coupling the S.O.S. cover to the portable terminal for permitting movement of the S.O.S. cover only in a predetermined section, wherein the bracket assembly includes a bracket for sliding in concert with movement of the S.O.S. cover.

2. The S.O.S cover opening and shutting apparatus of claim 1, wherein the bracket assembly includes a support affixed to the portable terminal, and whereon the bracket of said bracket assembly is slidably attached.

3. The S.O.S. cover opening and shutting apparatus of claim 1, wherein the S.O.S. cover has at least one screw fixing hole therein for coupling to the bracket.

4. The S.O.S. cover opening and shutting apparatus of claim 1, including a protrusion for providing a clicking sensation to a user when the S.O.S. cover slidingly moves, and allowing the S.O.S. cover to be arranged against/in the rear case in a non-active state.

5. The S.O.S. cover opening and shutting apparatus of claim 4, wherein the rear case includes first and second case protrusions contacting the protrusion on the S.O.S. cover.

6. The S.O.S. cover opening and shutting apparatus of claim 1, wherein the apparatus includes an S.O.S. contact sensor and the S.O.S. cover includes a contact provided to make contact with the contact sensor for implementing an S.O.S. service when the S.O.S. cover slidingly moves.

7. The S.O.S. cover opening and shutting apparatus of claim 1, including a position sensor for sensing position of the S.O.S. cover, wherein said sensor senses a position of the S.O.S. cover for implementing an S.O.S. service when a position of the S.O.S. cover changes by a predetermined threshold.

8. The S.O.S cover opening and shutting apparatus of claim 7, wherein the sensor optically senses a position of the S.O.S. cover.

9. The S.O.S cover opening and shutting apparatus of claim 7, wherein the sensor magnetically senses a position of the S.O.S. cover.

10. The S.O.S. cover opening and shutting apparatus of claim 1, wherein the S.O.S. cover includes a guide for preventing left/right swinging against the rear case when the S.O.S. cover slidingly moves; and an L-shaped hook coupled to the rear case to prevent up/down swinging during the sliding movement.

11. The S.O.S. cover opening and shutting apparatus of claim 10, wherein the rear case includes a sliding groove into which the guide provided on the S.O.S. cover is inserted; and an L-shaped guide protrusion provided on the rear case in association with the L-shaped hook on the S.O.S. cover.

* * * * *